(12) United States Patent
Calabretta et al.

(10) Patent No.: US 12,487,187 B2
(45) Date of Patent: Dec. 2, 2025

(54) SYSTEM AND METHOD FOR POWER MODULE DEFECT DETECTION

(71) Applicant: STMicroelectronics S.r.l., Agrate Brianza (IT)

(72) Inventors: Michele Calabretta, Giarre (IT); Francesco Rundo, Gravina di Catania (IT); Salvatore Coffa, Milan (IT); Marco Alfio Torrisi, Aci Sant'Antonio (IT); Riccardo Emanuele Sarpietro, Paternò (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 268 days.

(21) Appl. No.: 18/168,017

(22) Filed: Feb. 13, 2023

(65) Prior Publication Data

US 2024/0272088 A1 Aug. 15, 2024

(51) Int. Cl.
*G01N 21/95* (2006.01)
*G06T 7/00* (2017.01)

(52) U.S. Cl.
CPC ....... *G01N 21/9501* (2013.01); *G06T 7/0004* (2013.01); *G06T 2207/20081* (2013.01); *G06T 2207/20084* (2013.01); *G06T 2207/30148* (2013.01)

(58) Field of Classification Search
CPC .............. G01N 21/9501; G06T 7/0004; G06T 2207/20084; G06T 2207/20081; G06T 2207/30148
See application file for complete search history.

(56) References Cited

U.S. PATENT DOCUMENTS

| | | | | |
|---|---|---|---|---|
| 6,411,359 B1* | 6/2002 | Kobayashi | .......... | G02F 1/13452 349/149 |
| 2001/0028734 A1* | 10/2001 | Guest | ...................... | G06T 7/001 382/149 |
| 2004/0146295 A1* | 7/2004 | Furman | ............ | G01N 21/95607 398/9 |
| 2005/0117796 A1* | 6/2005 | Matsui | ................... | G06T 7/001 382/145 |
| 2005/0214958 A1* | 9/2005 | Nakasuji | .............. | G01N 23/225 250/310 |

(Continued)

OTHER PUBLICATIONS

Maslej-Krešňáková, V. et al., "Automatic Detection of Atmospherics and Tweek Atmospherics in Radio Spectrograms Based on a Deep Learning Approach," Earth and Space Science, 8, e2021EA002007, Oct. 27, 2021, 14 pages.

(Continued)

*Primary Examiner* — Sang H Nguyen
(74) *Attorney, Agent, or Firm* — Slater Matsil LLP (57) ABSTRACT

In an embodiment, a method includes: capturing a first image of a power module, the power module including a power electronics circuit, the power electronics circuit including power semiconductor dies; identifying positions of the power semiconductor dies in the first image with a die detection model; extracting second images of the power semiconductor dies from the first image according to the positions of the power semiconductor dies in the first image; and identifying defects of the power semiconductor dies in the second images with a defect detection model, the defect detection model being different from the die detection model.

21 Claims, 9 Drawing Sheets

(56) References Cited

U.S. PATENT DOCUMENTS

| | | | | |
|---|---|---|---|---|
| 2005/0271261 | A1* | 12/2005 | Onishi | G06T 7/001 382/218 |
| 2006/0133660 | A1* | 6/2006 | Ogi | G06T 7/001 382/149 |
| 2007/0019858 | A1* | 1/2007 | Shimura | G06T 7/001 382/149 |
| 2007/0165940 | A1* | 7/2007 | Ishikawa | H01L 21/67288 382/145 |
| 2008/0049219 | A1* | 2/2008 | Kim | G01N 21/95607 356/237.4 |
| 2012/0312864 | A1* | 12/2012 | Guth | H01L 24/27 228/248.1 |

OTHER PUBLICATIONS

Mehrotra, V. et al., "Wirebond Reliability in IGBT-Power Modules: Application of High Resolution Strain and Temperature Mapping," 11th International Symposium on Power Semiconductor Devices and ICs. ISPSD'99 Proceedings (Cat. No.99CH36312), Toronto, ON, Canada, May 26-28, 1999, doi: 10.1109/ISPSD.1999.764076, pp. 113-116.

Polschikova, O.V. et al., "Multispectral Digital Holography Based on Acousto-Optic Spectral Tuning in a Common-Path Interferometer," 2018 Wave Electronics and its Application in Information and Telecommunication Systems (WECONF), St. Petersburg, Russia, Nov. 26-30, 2018, doi: 10.1109/WECONF.2018.8604356, pp. 1-4.

Putaala, J. et al., "Power Module Interconnection Reliability in BTS Applications," IEEE Transactions on Device and Materials Reliability, vol. 19, No. 3, Sep. 2019, doi: 10.1109/TDMR.2019.2920316, pp. 484-493.

Redmon, J. et al., "You Only Look Once: Unified, Real-Time Object Detection," arXiv:1506.02640v5, May 9, 2016, 10 pages.

"SiC Power Devices and Modules, Application Note," ROHM Semiconductor, No. 63AN102E. Rev.003, https://fscdn.rohm.com/en/products/databook/applinote/discrete/sic/common/sic_appli-e.pdf, Nov. 2020, 89 pages.

"YOLOv5 Architecture Summary," YOLOv5 Documentation, https://docs.ultralytics.com/tutorials/architecture-summary/, downloaded Dec. 28, 2022, 11 pages.

* cited by examiner

SYSTEM AND METHOD FOR POWER MODULE DEFECT DETECTION

TECHNICAL FIELD

The present invention relates generally to a system and method for defect detection, and, in particular embodiments, to a system and method for power module defect detection.

BACKGROUND

Power modules are power electronics that can handle large currents. Power modules include power devices, e.g., transistors, diodes, etc. Some types of power devices, such as silicon carbide (SiC) based power devices, may allow for greater power efficiency and/or a higher switching frequency. Defects in SiC based power devices may lead to anomalous behavior of a power module. One technique for detecting defects in SiC based power devices is optical microscopy.

SUMMARY

In an embodiment, a system includes: a processing tool configured to perform a manufacturing process to form a power module, the power module including power semiconductor dies; a camera configured to capture a first image of the power module; and a controller configured to: identify positions of the power semiconductor dies in the first image with a die detection model; extract second images of the power semiconductor dies from the first image according to the positions of the power semiconductor dies; and identify defects in the second images with a defect detection model, the defect detection model being different from the die detection model. In some embodiments of the system, the controller is further configured to: control the processing tool to stop the manufacturing process in response to identifying the defects in the second images. In some embodiments of the system, the camera includes an optical microscope configured to sense ultraviolet light rays, and the power module further includes a passivation layer on the power semiconductor dies, the passivation layer being transparent to the ultraviolet light rays. In some embodiments of the system, the die detection model includes a convolutional neural network, and the controller is configured to identify the positions of the power semiconductor dies in the first image by processing the first image with the convolutional neural network to simultaneously predict bounding boxes of the power semiconductor dies in the first image and predict class probabilities for the bounding boxes. In some embodiments of the system, the controller is further configured to identify the positions of the power semiconductor dies in the first image by downsizing the first image before processing the first image with the convolutional neural network. In some embodiments of the system, the defect detection model includes a convolutional neural network, and the controller is configured to identify the defects of the power semiconductor dies in the second images by processing the second images with the convolutional neural network to simultaneously predict bounding boxes of the defects in the second images and predict class probabilities for the bounding boxes. In some embodiments of the system, the controller is further configured to identify the defects of the power semiconductor dies by upsizing the second images before processing the second images with the convolutional neural network. In some embodiments of the system, the controller includes a memory, and the die detection model and the defect detection model are stored in the memory.

In an embodiment, a method includes: capturing a first image of a power module, the power module including a power electronics circuit, the power electronics circuit including power semiconductor dies; identifying positions of the power semiconductor dies in the first image with a die detection model; extracting second images of the power semiconductor dies from the first image according to the positions of the power semiconductor dies in the first image; and identifying defects of the power semiconductor dies in the second images with a defect detection model, the defect detection model being different from the die detection model. In some embodiments of the method, the power electronics circuit further includes a gate driver and passive devices. In some embodiments of the method, the power electronics circuit is a chopper circuit, a DC-to-DC converter circuit, an inverter circuit, or a relay circuit. In some embodiments of the method, the power semiconductor dies are silicon carbide dies. In some embodiments of the method, capturing the first image includes sensing ultraviolet light rays with an optical microscope, and the power module further includes a passivation layer on the power semiconductor dies, the passivation layer being transparent to the ultraviolet light rays. In some embodiments of the method, the die detection model includes a convolutional neural network, and identifying the positions of the power semiconductor dies in the first image includes processing the first image with the convolutional neural network to simultaneously predict bounding boxes of the power semiconductor dies in the first image and predict class probabilities for the bounding boxes. In some embodiments of the method, identifying the positions of the power semiconductor dies in the first image further includes downsizing the first image before processing the first image with the convolutional neural network. In some embodiments of the method, the defect detection model includes a convolutional neural network, and identifying the defects of the power semiconductor dies in the second images includes processing the second images with the convolutional neural network to simultaneously predict bounding boxes of the defects in the second images and predict class probabilities for the bounding boxes. In some embodiments of the method, identifying the defects of the power semiconductor dies further includes upsizing the second images before processing the second images with the convolutional neural network. In some embodiments, the method further includes: training the die detection model with power module images; and training the defect detection model with power semiconductor die images. In some embodiments, the method further includes: performing a manufacturing process to form the power module, the defects of the power semiconductor dies being from the manufacturing process; and stopping the manufacturing process in response to identifying the defects of the power semiconductor dies. In some embodiments, the method further includes: performing a testing process to test the power module, the defects of the power semiconductor dies being from the testing process; and confirming the defects of the power semiconductor dies are present by visual inspection.

In an embodiment, a method includes: training a defect detection model with first images of first power semiconductor dies, the defect detection model including a convolutional neural network; forming a power module including second power semiconductor dies; capturing second images of the second power semiconductor dies; and identifying defects of the second power semiconductor dies in the second images with the defect detection model by processing the second images with the convolutional neural network to simultaneously predict bounding boxes of the defects in the second images and predict class probabilities for the bounding boxes.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

According to various embodiments, defects are identified in images of semiconductor dies with a defect detection model (e.g., an artificial intelligence model). Identifying defects in images of the semiconductor dies with a defect detection model is faster than with manual analysis of the power semiconductor dies. A high-efficiency defect detection model, such as a YOLO detection model, may be used, which may be particularly advantageous when defect detection is performed by a dedicated circuit.

Figure 1A:
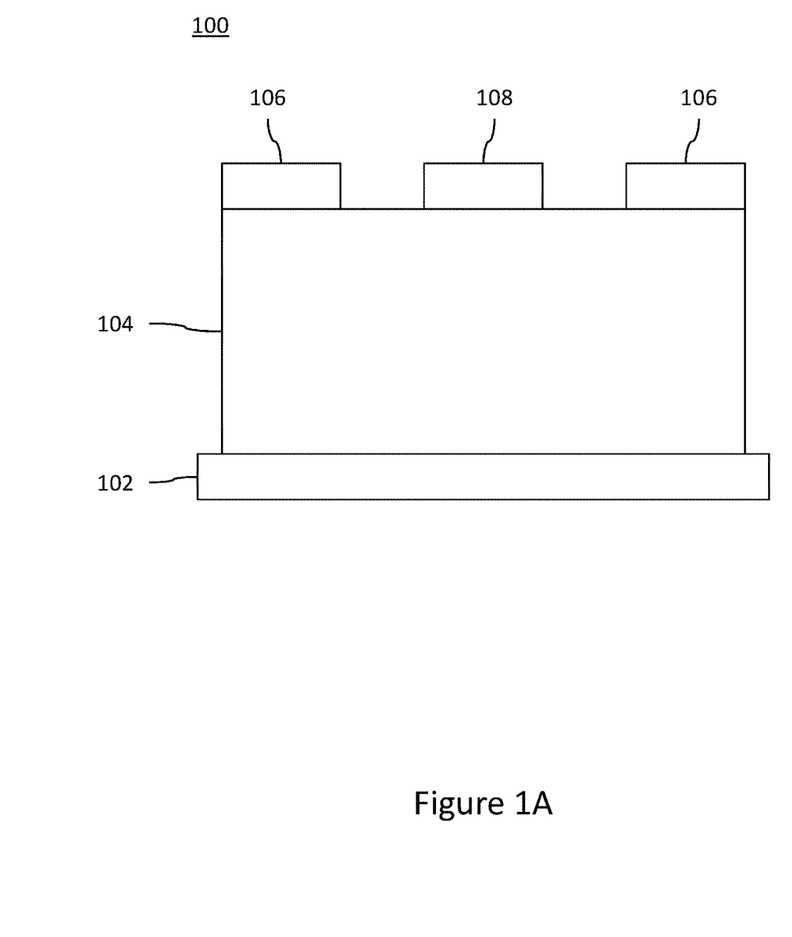
FIGS. 1A-1B are views of a power semiconductor die.
Figure 1B:
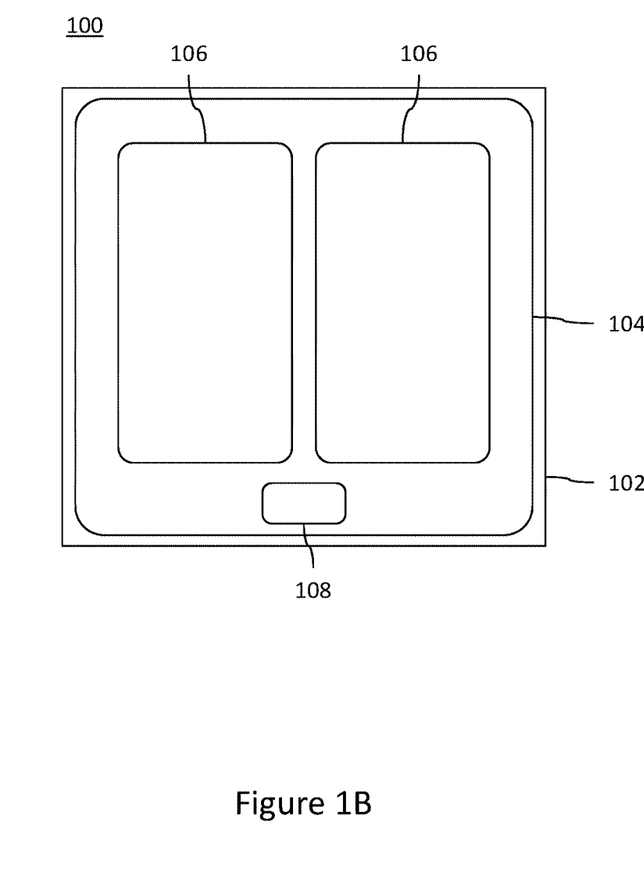

FIGS. 1A-1B are views of a power semiconductor die 100. FIG. 1A is a cross-sectional view and FIG. 1B is a top-down view. The power semiconductor die 100 includes a power device capable of operating at a high voltage and/or a high frequency, such as a silicon carbide (SiC) based power device, a gallium nitride (GaN) based power device, or the like. The power device may be a transistor such as a metal-oxide-semiconductor field-effect transistor (MOSFET), a bipolar transistor, or the like; a diode such as a Schottky barrier diode (SBD); or the like. The power semiconductor die 100 may be formed in a suitable front-end of line (FEOL) process by acceptable deposition, photolithography, and etching techniques.

In some embodiments, the power semiconductor die 100 is a silicon carbide die that includes an SiC MOSFET. Such a power semiconductor die 100 includes a drain electrode 102, semiconductor layers 104, source electrodes 106, and a gate electrode 108. Other types of power semiconductor dies may have other arrangements of features. Additionally, it should be appreciated that the power semiconductor die 100 may include other features (not separately illustrated).

The drain electrode 102 may be formed of a conductive material, such as titanium, aluminum, nickel, gold, combinations thereof, or the like, which may be formed by a deposition process such as physical vapor deposition (PVD) or CVD, a plating process such as electrolytic or electroless plating, or the like. The drain electrode 102 may (or may not) be wider than overlying features (e.g., the semiconductor layers 104).

The semiconductor layers 104 are formed on the drain electrode 102. The semiconductor layers 104 include any desired quantity of channel layers, well layers, drift layers, and the like. Each of the semiconductor layers 104 may be formed of silicon; germanium; a compound semiconductor including silicon carbide, gallium arsenide, gallium phosphide, indium phosphide, indium arsenide, and/or indium antimonide; an alloy semiconductor including silicon-germanium, gallium arsenide phosphide, aluminum indium arsenide, aluminum gallium arsenide, gallium indium arsenide, gallium indium phosphide, and/or gallium indium arsenide phosphide; or combinations thereof. Each of the semiconductor layers 104 may be epitaxially grown using a process such as vapor phase epitaxy (VPE) or molecular beam epitaxy (MBE), deposited using a process such as chemical vapor deposition (CVD) or atomic layer deposition (ALD), or the like. In some embodiments, the semiconductor layers 104 include a silicon carbide layer.

The source electrodes 106 and the gate electrode 108 are formed on the semiconductor layers 104. The source electrodes 106 and the gate electrode 108 may each be formed of a conductive material, such as titanium, aluminum, nickel, gold, combinations thereof, or the like, which may be formed by a deposition process such as physical vapor deposition (PVD) or CVD, a plating process such as electrolytic or electroless plating, or the like. The source electrodes 106 and the gate electrode 108 may be formed in the same cross-section (as shown by FIG. 1A) or may be formed in different cross-sections (as shown by FIG. 1B). Additional layers (not separately illustrated), such as dielectric layers, interfacial layers, work function tuning layers, and the like may also be formed. For example, a gate dielectric layer may be formed between the gate electrode 108 and the semiconductor layers 104.

The power semiconductor die 100 of this example includes an SiC MOSFET having a planar structure. Other structures may be utilized. For example, the SiC MOSFET may have a trench structure, such as a single trench structure, a double trench structure, or the like.

Figure 2:
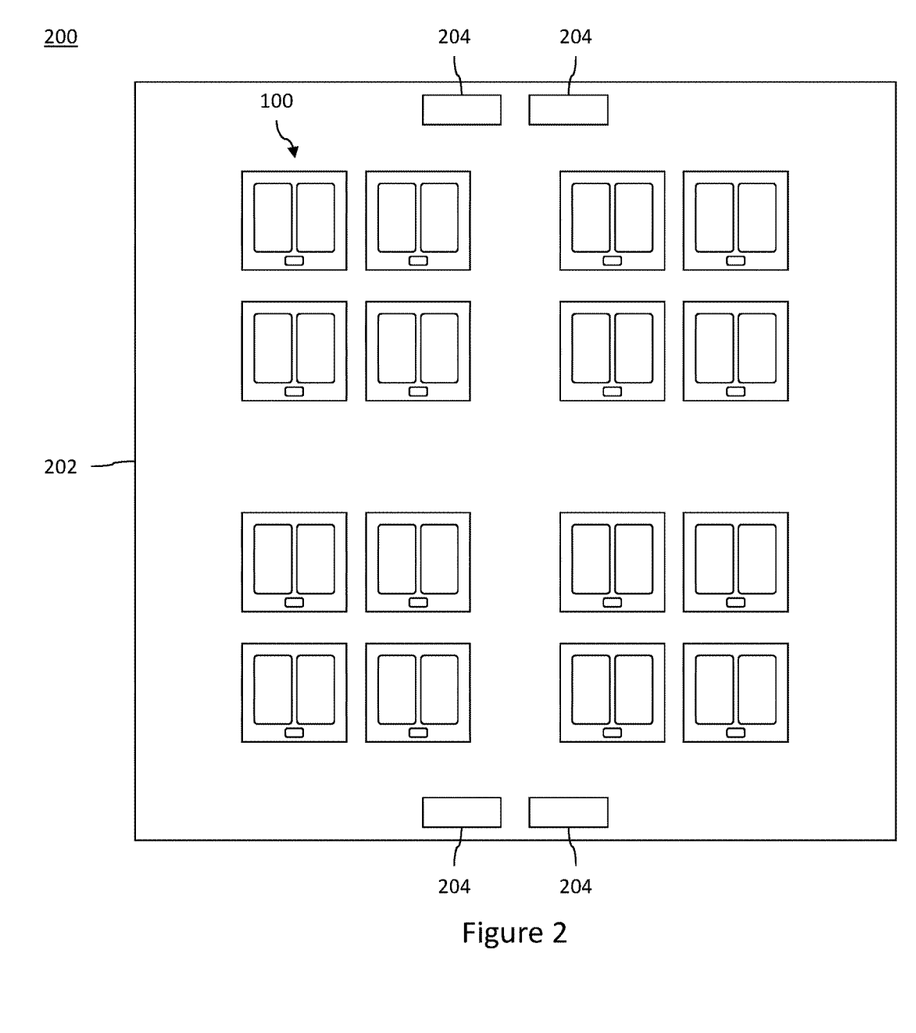
FIG. 2 is a top-down view of a power module.

FIG. 2 is a top-down view of a power module 200. The power module 200 includes a package substrate 202 and a power electronics circuit, which includes one or more power semiconductor dies 100 mounted to the package substrate 202. The power electronics circuit may be any desired type of circuit, such as a chopper circuit, a DC-to-DC converter circuit, an inverter circuit, or a relay circuit. It should be appreciated that the power electronics circuit may include other circuit elements (not separately illustrated), such as passive devices, a gate driver, or the like, mounted to the package substrate 202. The power electronics circuit may include a plurality of the power semiconductor dies 100. In this example, sixteen power semiconductor dies 100 are utilized. In embodiments where the power semiconductor die 100 are SiC MOSFETs, the power module 200 is an SiC power module.

The package substrate 202 includes a substrate core and bond pads over the substrate core. The substrate core may be formed of a semiconductor material such as silicon, germanium, diamond, or the like. The substrate core is, in one alternative embodiment, based on an insulating core such as a fiberglass reinforced resin core. An example core material is fiberglass resin such as FR4. Alternatives for the core material include bismaleimide-triazine BT resin, or alternatively, other PCB materials or films. Build up films such as ABF or other laminates may be used for the substrate core. The substrate core may (or may not) include active and/or passive devices. A wide variety of devices such as transistors, capacitors, resistors, combinations of these, and the like may be used to generate the structural and functional requirements of the design for the power module 200. The devices may be formed using any suitable methods. The substrate core may also include metallization layers and vias (not shown), with the bond pads being physically and/or electrically coupled to the metallization layers and vias. The metallization layers may be formed over the active and passive devices and are designed to connect the various devices to form functional circuitry. The metallization layers may be formed of alternating layers of a dielectric material (e.g., a low-k dielectric material) and a conductive material (e.g., copper) with vias interconnecting the layers of conductive material and may be formed through any suitable process (such as deposition, damascene, dual damascene, or the like). In some embodiments, the substrate core is substantially free of active and passive devices.

The power semiconductor dies 100 are attached to the bond pads of the package substrate 202. For example, conductive connectors (such as reflowable connectors, not separately illustrated) may be used to electrically and/or physically couple the package substrate 202, including metallization layers of the package substrate 202, to the power semiconductor dies 100, such as to the drain electrodes 102 (see FIG. 1A). Wire bonds (not separately illustrated) may be connected to the source electrodes 106 and the gate electrodes 108 (see FIG. 1A). For example, a leg of the power electronics circuit may be formed by coupling together multiple source electrodes 106 of multiple power semiconductor dies 100 with wire bonds. The wire bonds and the metallization layers of the package substrate 202 connect the power semiconductor dies 100 and other circuit elements (if present) together to form a desired power electronics circuit.

The power module 200 may further include external connectors 204. The external connectors 204 may be push pins, in-line package switches, or the like, which may be electrically and/or physically coupled to the metallization layers of the package substrate 202. An external device, such as a device implementing the power module 200, may be connected to the power electronics circuit through the external connectors 204.

Additional features may be included in the power module 200. In some embodiments, the power module 200 also includes a passivation layer (not separately illustrated). The passivation layer is formed on the package substrate 202, the power semiconductor dies 100, the wire bonds, any other circuit elements (if present), etc. such that the passivation layer covers and protects the components of the power module 200. The passivation layer is transparent to ultraviolet light rays that will be used to capture an image of the power module 200. As such, an image of the power semiconductor dies 100 may be captured even when the power semiconductor dies 100 are covered by the passivation layer.

Figure 3:
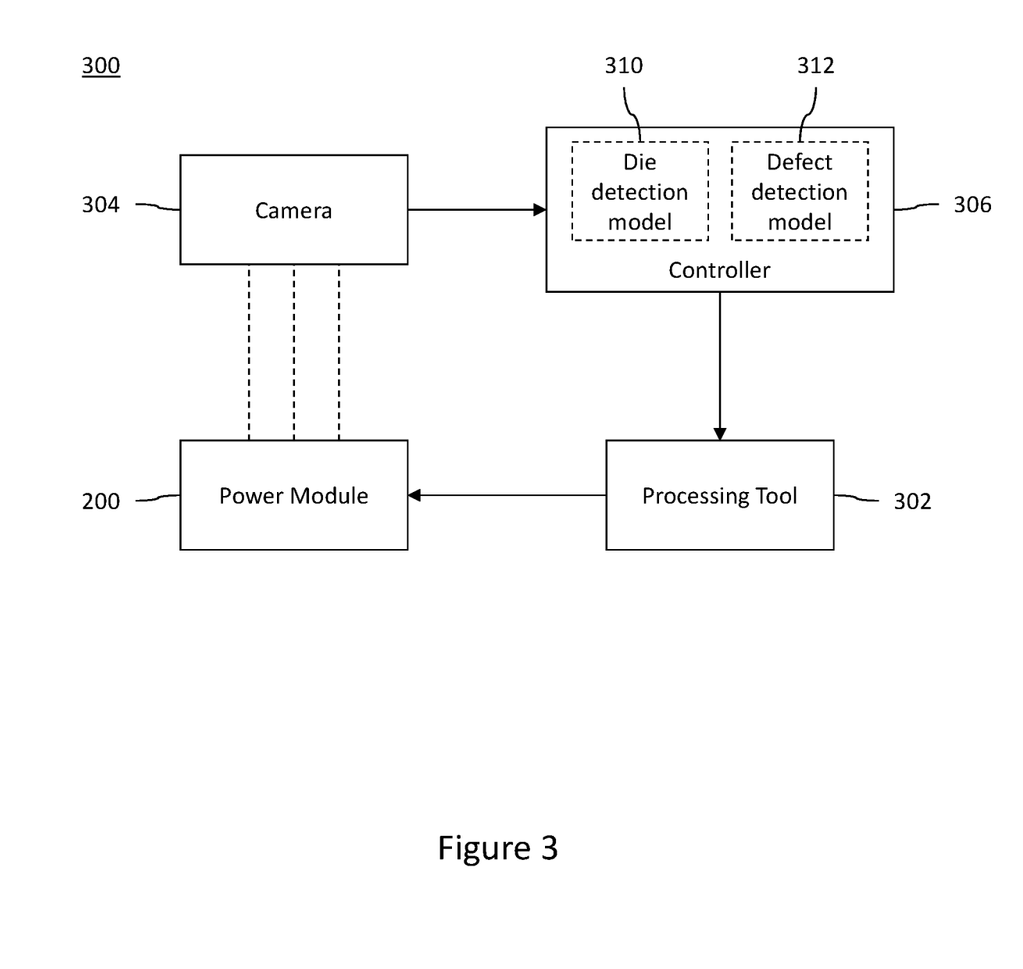
FIG. 3 is a block diagram of a power module manufacturing system, in accordance with some embodiments.

FIG. 3 is a block diagram of a power module manufacturing system 300, in accordance with some embodiments. The power module manufacturing system 300 includes a processing tool 302, a camera 304, and a controller 306. The components of the power module manufacturing system 300 work together to manufacture a power module 200 and/or analyze the power module 200 for defects.

The processing tool 302 is adapted to perform one or more of a large number of manufacturing processes. The manufacturing processes can be used to form a power module 200. Example manufacturing processes include deposition processes, photolithography processes, etching processes, planarization processes, annealing processes, reflowing processes, wire bonding processes, and other types of processes. For example, the processing tool 302 may include a deposition system, a photolithography system, an etcher, a wire bonder, or the like. The processing tool 302 is illustrated as a single element for illustrative purposes. In some embodiments, the processing tool 302 includes multiple elements.

The camera 304 is adapted to capture images of the power module 200. In some embodiments, the camera 304 includes an optical microscope, which is operable to capture images of the power module 200. The camera 304 may be part of an ultraviolet laser inspection system that is adapted to sense ultraviolet light rays. For example, the camera 304 may be a KEYENCE® VHX-7000 Series Digital Microscope. Other acceptable cameras may be utilized. The camera 304 is oriented to take images of the power module 200 from a top-down view of the power module 200.

The controller 306 is adapted to receive images from the camera 304, and to control the processing tool 302. The controller 306 is connected to the camera 304 and to the processing tool 302. The controller 306 may include a control circuit, a processor, an application-specific integrated circuit, a microcontroller, or the like. For example, the controller 306 may include one or more processors and memories, such as non-transitory computer readable storage mediums, that store programming for execution by the processors. Similarly, the controller 306 may include a dedicated circuit such as an application-specific integrated circuit (ASIC), a field programmable gate array (FPGA), or the like. One or more modules within the controller 306 may be partially or wholly embodied as software and/or hardware for performing any functionality described herein. The controller 306 is illustrated as a single element for illustrative purposes. In some embodiments, the controller 306 includes multiple elements. The controller 306 may include storage (e.g., volatile or non-volatile memory) for storing detection models which will be used for semiconductor die and defect identification, including a die detection model 310 and a defect detection model 312. Parameters may be hardcoded or input to the controller 306 through an input device (not separately illustrated).

After one or more manufacturing processes have been performed on the power module 200 with the processing tool 302, the power module 200 will be analyzed for defects. If defects are identified, then further processing of the power module 200 may be halted to reduce manufacturing costs. The manufacturing processes (e.g., parameters associated with the manufacturing processes) may be adjusted to reduce the formation of defects in the future. If no defects are identified, then the manufacturing processes may be assumed to be functioning properly and may not need to be adjusted. Defects can cause SiC power modules to exhibit anomalous behavior, such as anomalous electrical behavior or anomalous thermal behavior. The defects may be defects in the power semiconductor dies 100, such as cracks in the drain electrodes 102 or the semiconductor layers 104 of the power semiconductor dies 100. A defect in a power semiconductor die 100 may be a minor defect (which causes degraded performance of the power semiconductor die 100) or may be a major defect (which causes total failure of the power semiconductor die 100). Optical microscopy may be utilized to identify defects in the power semiconductor dies 100.

As subsequently described in greater detail, a defect detection model 312 will be used to automatically identify defects in images of the power semiconductor dies 100. Identifying defects in images of the power semiconductor dies 100 with the defect detection model 312 is faster than with manual analysis of the power semiconductor dies 100 by a human operator, particularly when the power module 200 includes a plurality of the power semiconductor dies 100. For example, a power module 200 that includes sixteen power semiconductor dies 100 may take several hours to manually analyze with an optical microscope, while images of those power semiconductor dies 100 may take less time to analyze with the defect detection model 312. Additionally, identifying defects (particularly, minor defects) in images of the power semiconductor dies 100 with the defect detection model 312 may be more accurate than with manual analysis of the power semiconductor dies 100.

Figure 4:
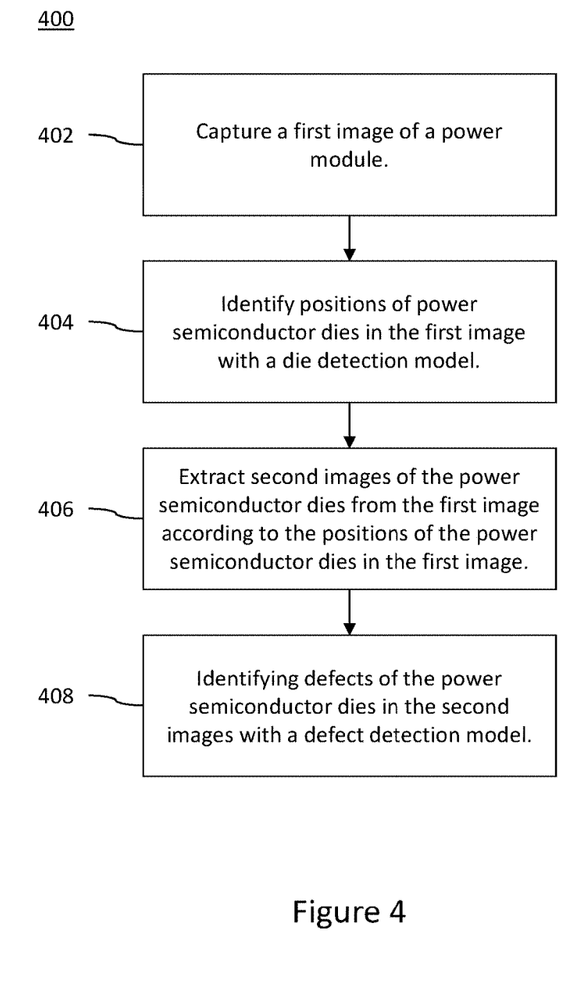
FIG. 4 is a diagram of a method for detecting defects in a power module, in accordance with some embodiments.

FIG. 4 is a diagram of a method 400 for detecting defects in a power module 200, in accordance with some embodiments. The method 400 is described in conjunction with FIGS. 1-3. As subsequently described in greater detail, the method 400 may be used on its own, or may be integrated into a manufacturing process or a testing process for the power module 200. The controller 306 may perform the steps of the method 400 by controlling the components of the power module manufacturing system 300.

In step 402, a first image of a power module 200 is captured. The first image is captured by the camera 304. The camera 304 is oriented such that the first image shows a top-down view of the power module 200. The first image may have a high resolution, such as a resolution of 8000 by 8000 pixels. As previously noted, a power module 200 may include a passivation layer (not separately illustrated) over the power semiconductor dies 100. The camera 304 may capture the first image by sensing ultraviolet light rays, to which the passivation layer is transparent. As such, the first image may be captured even when the power semiconductor dies 100 are covered by the passivation layer.

In step 404, positions of the power semiconductor dies 100 are identified in the first image of the power module 200. The positions of the power semiconductor dies 100 are identified with a die detection model 310. Specifically, the first image is input to the die detection model 310, the die detection model 310 is used to process the first image (e.g., with a suitable machine learning framework such as PyTorch), and the die detection model 310 outputs one or more tensors. Each tensor includes coordinates of a bounding box for the first image, where the bounding box is a portion (e.g., subset of the pixels) of the first image that is predicted to depict a power semiconductor die 100. Each tensor also includes a confidence value of the prediction, which may be a value between 0 and 1, with values closer to 1 indicating a more confident prediction that the bounding box is around a power semiconductor die 100 in the first image. In some embodiments, tensors with a low confidence value are discarded, where a low confidence value is a confidence value that is less than a desired threshold. For example, only tensors with a confidence value greater than or equal to 0.9 (e.g., 90% confidence) may be used. Thus, only die position tensors, which are tensors with sufficiently high confidence values, undergo subsequent processing, and other tensors, which have low confidence values, are not subsequently processed.

The die detection model 310 includes one or more neural network(s) that are trained to automatically identify power semiconductor dies 100 in an image of a power module 200. For example, the die detection model 310 may include a convolutional neural network. The neural network(s) include one or more neural layer(s) of neurons and weights associated with the neurons. Identifying the positions of the power semiconductor dies 100 in the first image includes processing the first image with the convolutional neural network. The convolutional neural network is adapted to simultaneously predict bounding boxes of the power semiconductor dies 100 in the first image and also predict class probabilities for the bounding boxes. The class probabilities indicate the likelihood that a bounding box contains an object, and are used to calculate the confidence values of the output tensors. Examples of models that allow simultaneous prediction will be subsequently described.

Optionally, the first image may be resized before it is processed by the die detection model 310 (e.g., by the convolutional neural network). Specifically, the first image may be downsized to decrease the resolution of the first image. An appropriate interpolation technique, such as a bicubic interpolation, may be used to shrink the first image. The chrominance and luminance of first image may both be resized. Downsizing the first image may increase performance of the die detection model 310, particularly when the first image has a high resolution. When the first image is resized, the bounding boxes of the die position tensors are relative the original resolution of the first image.

In step 406, second images of the power semiconductor dies 100 are extracted from the first image of the power module 200. The second images of the power semiconductor dies 100 are extracted according to the positions of the power semiconductor dies 100 in the first image, which were identified with the die detection model 310. Specifically, the die position tensors output by the die detection model 310 are used to crop the first image. Each second image of a power semiconductor die 100 is a subset of the first image that is bounded by the bounding box of a die position tensor.

In step 408, defects of the power semiconductor dies 100 are identified in the second images of the power semiconductor dies 100. The defects of the power semiconductor dies 100 are identified with a defect detection model 312. The defect detection model 312 is different from the die detection model 310. Each respective one of the second images may be sequentially analyzed with the defect detection model 312. Specifically, each second image is input to the defect detection model 312, the defect detection model 312 is used to process the second image (e.g., with a suitable machine learning framework such as PyTorch), and the defect detection model 312 outputs one or more tensors. Each tensor includes coordinates of a bounding box for the second image, where the bounding box is a portion (e.g., subset of the pixels) of the second image that is predicted to depict a defect of a power semiconductor die 100. Each tensor also includes a confidence value of the prediction, which may be a value between 0 and 1, with values closer to 1 indicating a more confident prediction that the bounding box is around a defect of a power semiconductor die 100 in the second image. In some embodiments, tensors with a low confidence value are discarded, where a low confidence value is less than a desired threshold. For example, only tensors with a confidence value greater than or equal to 0.9 (e.g., 90% confidence) may be used. Thus, only defect position tensors, which are tensors with sufficiently high confidence values, undergo subsequent processing, and other tensors, which have low confidence values, are not subsequently processed. Accordingly, identifying the defects of the power semiconductor dies 100 includes identifying the positions of the defects in the second images of the power semiconductor dies 100.

The defect detection model 312 includes one or more neural network(s) that are trained to automatically identify defects in an image of a power semiconductor die 100. For example, the defect detection model 312 may include a convolutional neural network. The neural network(s) include one or more neural layer(s) of neurons and weights associated with the neurons. Identifying the defects of the power semiconductor dies 100 in a second image includes processing the second images with the convolutional neural network. The convolutional neural network is adapted to simultaneously predict bounding boxes of defects of the power semiconductor dies 100 in the second images and also predict class probabilities for the bounding boxes. The class probabilities indicate the likelihood that a bounding box contains an object, and are used to calculate the confidence values of the output tensors. Examples of models that allow simultaneous prediction will be subsequently described.

Optionally, the second images may be resized before they are processed by the defect detection model 312 (e.g., by the convolutional neural network). Specifically, the second images may be upsized to increase the resolution of the second images. An appropriate interpolation technique, such as a bicubic interpolation, may be used to expand the second images. The chrominance and luminance of second images may both be resized. Upsizing the second images may increase accuracy of the defect detection model 312, particularly when the second images have a low resolution as a result of being a cropped portion of the first image. When the second images are resized, the bounding boxes of the defect position tensors are relative the original resolution of the second images.

Once the positions of the defects in the second images of the power semiconductor dies 100 are identified, the information may be used in several manners. In some embodiments, the presence and/or positions of defects in the power semiconductor dies 100 are indicated to a user, such as with a display of the controller 306. In some embodiments, a manufacturing process is stopped responsive to detecting defects in the power semiconductor dies 100. In some embodiments, a visual inspection is performed responsive to detecting defects in the power semiconductor dies 100.

Figure 5A:
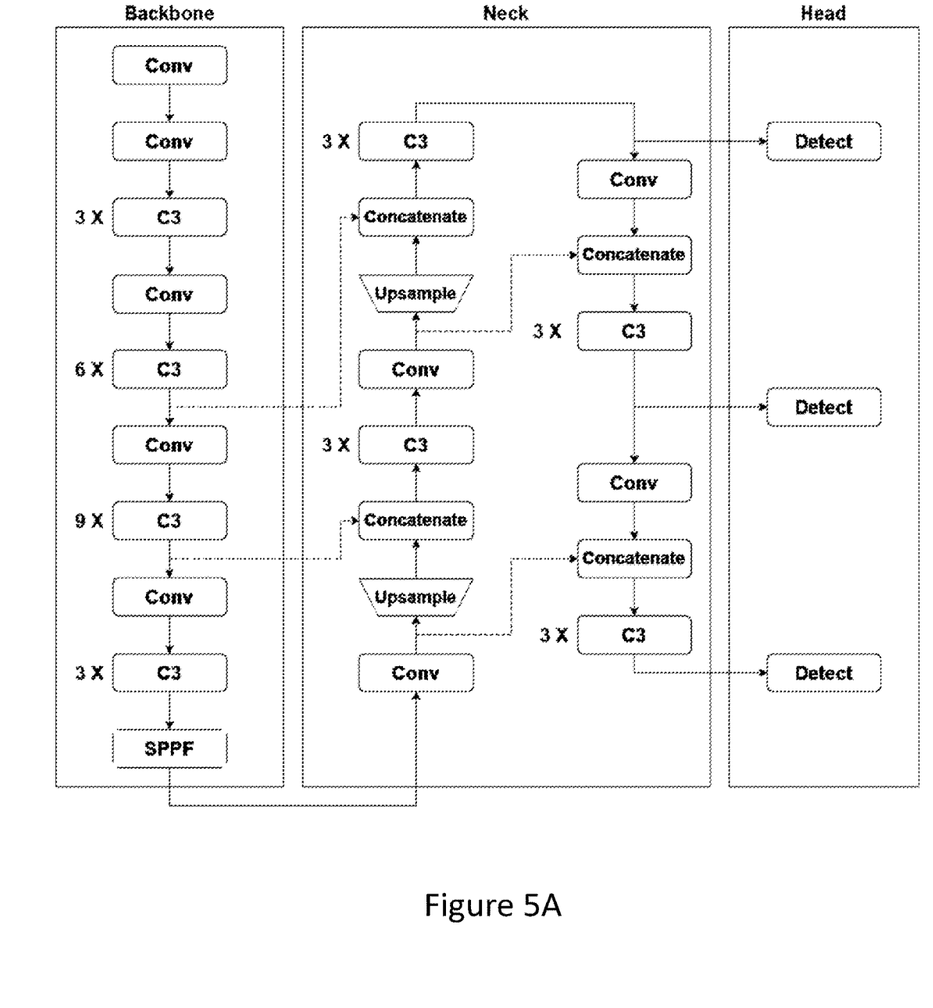
FIGS. 5A-5D are diagrams of a detection model.
Figure 5B:
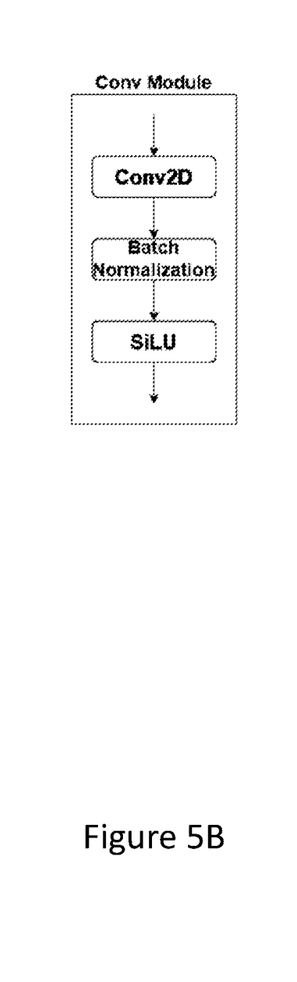
Figure 5C:
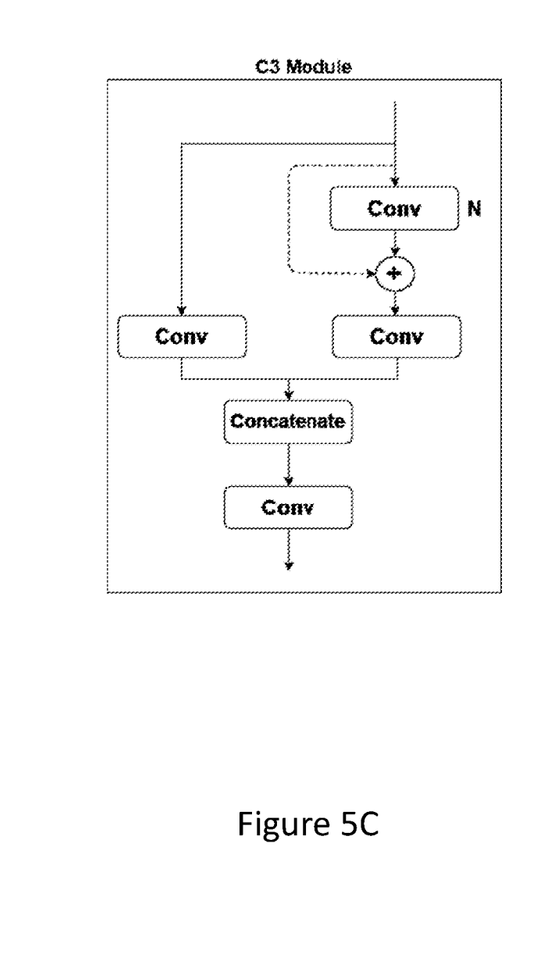
Figure 5D:
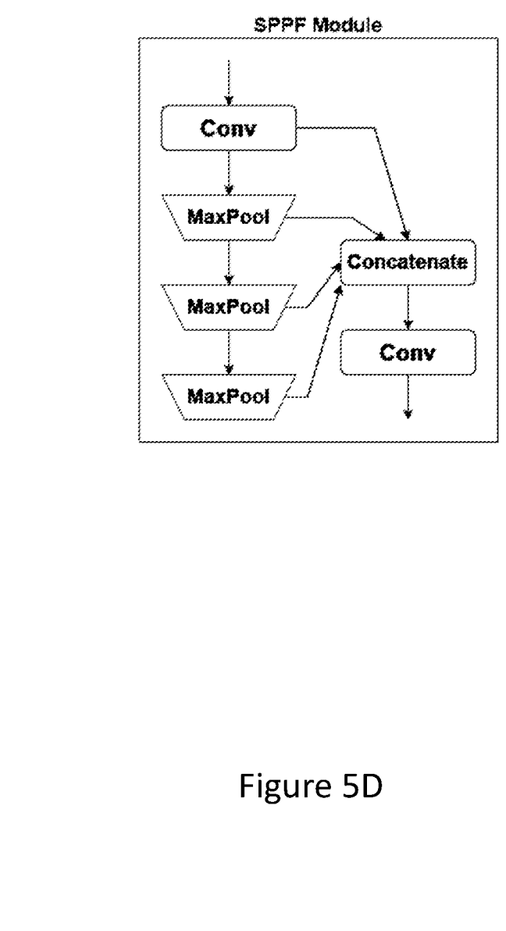

As previously noted, both the die detection model 310 and the defect detection model 312 are models that are adapted to simultaneously predict bounding boxes of objects in an image and also predict class probabilities for the bounding boxes. Examples of models that allow simultaneous prediction include the You Only Look Once (YOLO) family of models, such as the YOLOv5n model, the YOLOv5s model, the YOLOv5m model, or the like, which perform segmentation of an image and identify bounding boxes of objects in the segments of the image. The die detection model 310 and the defect detection model 312 may be the same type of model (e.g., YOLO models), but the weights associated with the neurons of each neural layer may be different, such that the models are adapted to detect different types of objects. The weights may be scalar values, matrix values, or the like. An example of such a model is demonstrated in FIGS. 5A-5D. FIG. 5A is a diagram of the architecture for a YOLO model. The YOLO model includes a backbone portion, a neck portion, and a head portion, which work together to product output tensors ("Detect"). FIG. 5B is a diagram of the architecture of the convolution modules ("Conv") from FIG. 5A. FIG. 5C is a diagram of the architecture of the Cross Stage Partial bottleneck modules ("C3") from FIG. 5A. FIG. 5D is a diagram of the architecture of the Fast Spatial Pyramid Pooling modules ("SPPF") in FIG. 5A. Simultaneously predicting the bounding boxes and the class probabilities for the bounding boxes may be less accurate than separately predicting the bounding boxes and the class probabilities, but may advantageously be more efficient, which may be particularly advantageous when the controller 306 is a dedicated circuit such as an application-specific integrated circuit (ASIC) or a field programmable gate array (FPGA).

Figure 6:
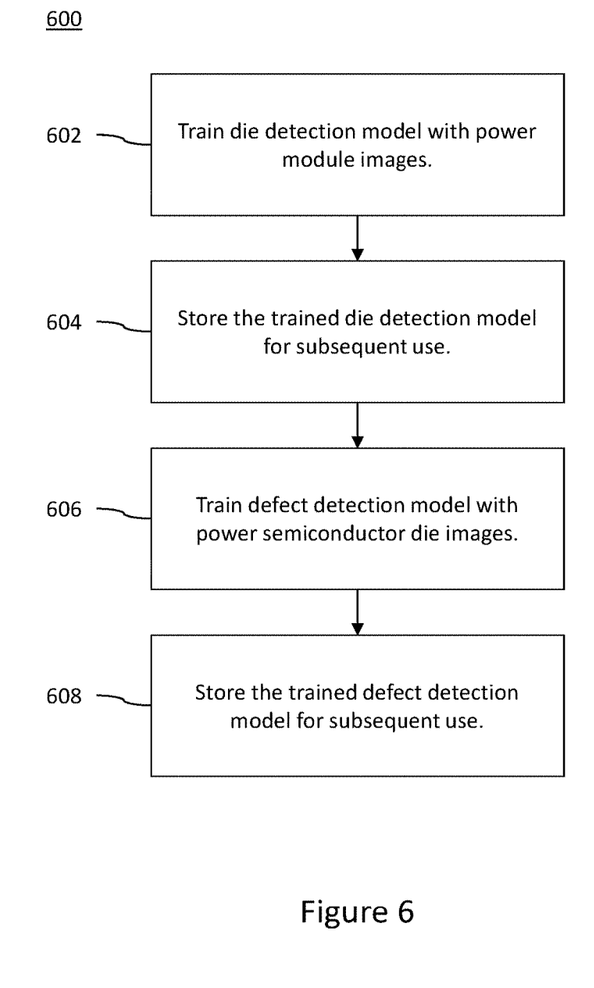
FIG. 6 is a diagram of a method for training die and defect detection models, in accordance with some embodiments.

FIG. 6 is a diagram of a method 600 for training die and defect detection models, in accordance with some embodiments. The method 600 is described in conjunction with FIGS. 3-4. The method 600 may be performed before detecting defects in a power module, e.g., before the method 400 (see FIG. 4). Specifically, the die and defect detection models may be trained separately from the performing of detection. It may be computationally expensive to train the die and defect detection models, and so training may be performed a different (e.g., higher performance) processor than the controller 306. The trained die and defect detection models may then be transferred to the controller 306.

In step 602, the die detection model 310 is trained with power module images. As noted above, the die detection model 310 includes one or more neural network(s). Those neural network(s) are trained to automatically identify power semiconductor dies 100 in an image of a power module 200. The die detection model 310 may be trained in a deep learning process. Specifically, the die detection model 310 undergoes a machine learning process that utilizes training set data, such as images of power modules known to contain power semiconductor dies. The die detection model 310 is not trained to distinguish between types of power semiconductor dies 100, but rather is trained to abstract the concept of a power semiconductor die. Accordingly, the die detection model 310, after training, may be capable of identifying types of power semiconductor dies 100 that were not depicted in the training set data. Once the training process is complete, the die detection model 310 may be used to automatically identify power semiconductor dies 100 in an image of a power module 200. The power semiconductor dies 100 identified with the die detection model 310 are different from the power semiconductor dies 100 that were used to train the die detection model 310.

In step 604, the trained die detection model 310 is stored for subsequent use. Storing the die detection model 310 may include storing the weights associated with the neurons of each neural layer of the die detection model 310. The die detection model 310 may be stored in a database, memory (e.g., non-volatile memory), or the like. In some embodiments, the die detection model 310 is stored in memory of the controller 306.

In step 606, the defect detection model 312 is trained with power semiconductor die images. As noted above, the defect detection model 312 includes one or more neural network(s). Those neural network(s) are trained to automatically identify defects in an image of a power semiconductor die 100. The defect detection model 312 may be trained in a deep learning process. Specifically, the defect detection model 312 undergoes a machine learning process that utilizes training set data, such as images of power semiconductor die known to contain defects. The defect detection model 312 is not trained to distinguish between types of defects, but rather is trained to abstract the concept of a defect. Accordingly, the defect detection model 312, after training, may be capable of identifying types of defects that were not depicted in the training set data. Once the training process is complete, the defect detection model 312 may be used to automatically identify defects in an image of a power semiconductor die 100. The defects identified with the defect detection model 312 are different from the defects that were used to train the defect detection model 312.

In step 608, the trained defect detection model 312 is stored for subsequent use. Storing the defect detection model 312 may include storing the weights associated with the neurons of each neural layer of the defect detection model 312. The defect detection model 312 may be stored in a database, memory (e.g., non-volatile memory), or the like. In some embodiments, the defect detection model 312 is stored in memory of the controller 306.

Figure 7:
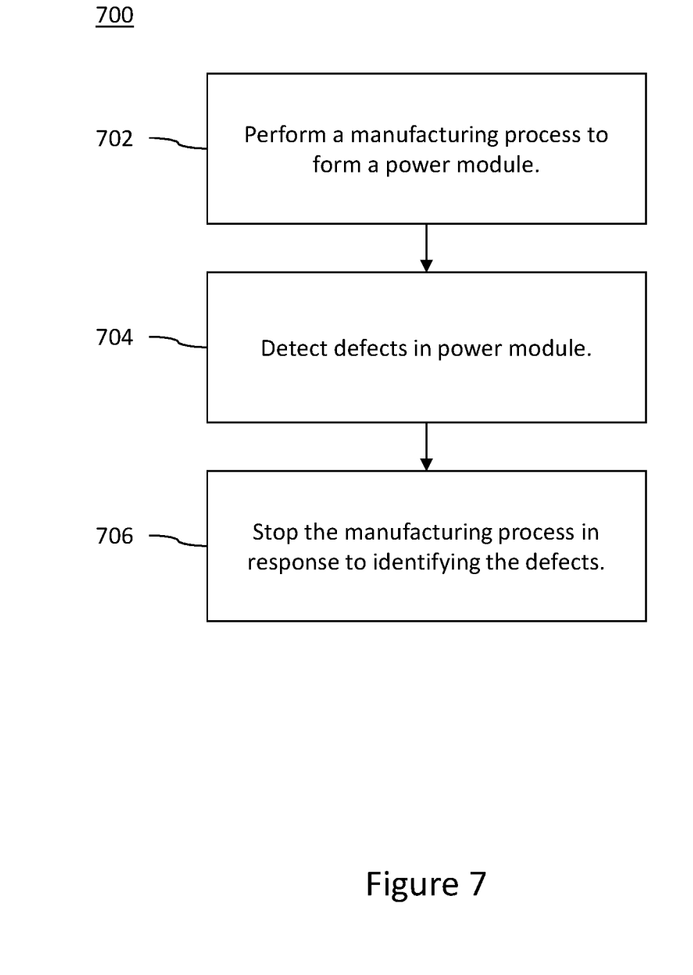
FIG. 7 is a diagram of a method for manufacturing a power module, in accordance with some embodiments.

FIG. 7 is a diagram of a method 700 for manufacturing a power module 200, in accordance with some embodiments. The method 700 is described in conjunction with FIGS. 1-4.

In step 702, a manufacturing process is performed to form a power module 200. The manufacturing process may be performed with the processing tool 302.

In step 704, defects are detected in the power semiconductor dies 100 of the power module 200. The defects may be detected using the method 400, and details will not be repeated. The defects may be from the manufacturing process. For example, heating/cooling steps performed during the manufacturing process may cause cracking of the power semiconductor dies 100. Similarly, impurities in the manufacturing process (e.g., particles from wire bonding, dicing, etc.) may be embedded in the power semiconductor dies 100, which leads to cracking.

In step 706, the manufacturing process is stopped in response to identifying defects in the power semiconductor dies 100 of the power module 200. The manufacturing process may be stopped by control the processing tool 302. The manufacturing process may be stopped so that the power module 200 may be reworked or discarded. In some embodiments, the manufacturing process is modified to reduce the formation of defects.

Figure 8:
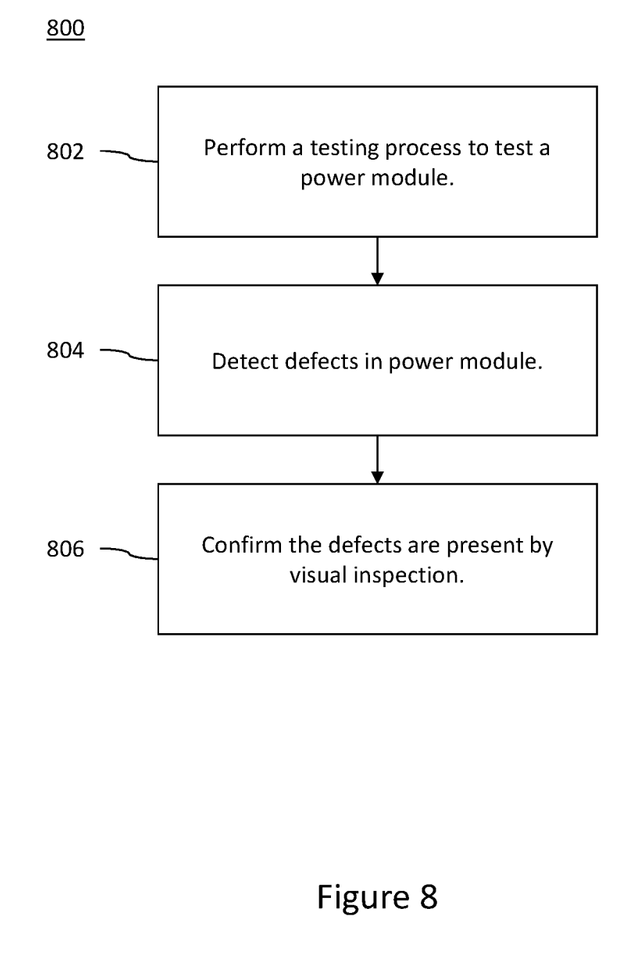
FIG. 8 is a diagram of a method for testing a power module, in accordance with some embodiments.

FIG. 8 is a diagram of a method 800 for testing a power module 200, in accordance with some embodiments. The method 800 is described in conjunction with FIGS. 1-4.

In step 802, a testing process is performed to test a power module 200. The testing process may be a reliability test for assessing the performance and/or reliability of the power module 200 in harsh conditions, such as high heat, high humidity, etc. The testing process may include performance cycling of the power module 200 in harsh conditions.

In step 804, defects are detected in the power semiconductor dies 100 of the power module 200. The defects may be detected using the method 400, and details will not be repeated. The defects may be from the testing process. For example, heating/cooling steps performed during the testing process may cause cracking of the power semiconductor dies 100.

In step 806, optionally, the presence of the defects is confirmed by visual inspection. For example, a human operator may use an optical microscope to inspect the power semiconductor dies 100 of the power module 200. The positions of the defects in the power semiconductor dies 100, identified in step 804, may be used by the operator. Specifically, the operator may visually inspect those areas of the power semiconductor dies 100 to confirm they contain the defects.

Embodiments may achieve advantages. Identifying defects in images of the power semiconductor dies 100 with a defect detection model 312 is faster than with manual analysis of the power semiconductor dies 100. Additionally, identifying defects (particularly, minor defects) in images of the power semiconductor dies 100 with the defect detection model 312 may be more accurate than with manual analysis of the power semiconductor dies 100. Utilizing a defect detection model that is adapted to simultaneously predict bounding boxes of objects in an image and also predict class probabilities for the bounding boxes, such as a YOLO detection model, may be more efficient than separately predicting the bounding boxes and the class probabilities. Increasing efficiency of the defect detection model 312 may be particularly advantageous when the controller 306 using the defect detection model 312 is a dedicated circuit.

Example embodiments of the invention are summarized here. Other embodiments can also be understood from the entirety of the specification as well as the claims filed herein Example 1. A system comprising: a processing tool configured to perform a manufacturing process to form a power module, the power module comprising power semiconductor dies; a camera configured to capture a first image of the power module; and a controller configured to: identify positions of the power semiconductor dies in the first image with a die detection model; extract second images of the power semiconductor dies from the first image according to the positions of the power semiconductor dies; and identify defects in the second images with a defect detection model, the defect detection model being different from the die detection model.

Example 2. The system of Example 1, wherein the controller is further configured to: control the processing tool to stop the manufacturing process in response to identifying the defects in the second images.

Example 3. The system of Example 1, wherein the camera comprises an optical microscope configured to sense ultraviolet light rays, and the power module further comprises a passivation layer on the power semiconductor dies, the passivation layer being transparent to the ultraviolet light rays.

Example 4. The system of Example 1, wherein the die detection model comprises a convolutional neural network, and the controller is configured to identify the positions of the power semiconductor dies in the first image by processing the first image with the convolutional neural network to simultaneously predict bounding boxes of the power semiconductor dies in the first image and predict class probabilities for the bounding boxes.

Example 5. The system of Example 4, wherein the controller is further configured to identify the positions of the power semiconductor dies in the first image by downsizing the first image before processing the first image with the convolutional neural network.

Example 6. The system of Example 1, wherein the defect detection model comprises a convolutional neural network, and the controller is configured to identify the defects of the power semiconductor dies in the second images by processing the second images with the convolutional neural network to simultaneously predict bounding boxes of the defects in the second images and predict class probabilities for the bounding boxes.

Example 7. The system of Example 6, wherein the controller is further configured to identify the defects of the power semiconductor dies by upsizing the second images before processing the second images with the convolutional neural network.

Example 8. The system of Example 1, wherein the controller comprises a memory, and the die detection model and the defect detection model are stored in the memory.

Example 9. A method comprising: capturing a first image of a power module, the power module comprising a power electronics circuit, the power electronics circuit comprising power semiconductor dies; identifying positions of the power semiconductor dies in the first image with a die detection model; extracting second images of the power semiconductor dies from the first image according to the positions of the power semiconductor dies in the first image; and identifying defects of the power semiconductor dies in the second images with a defect detection model, the defect detection model being different from the die detection model.

Example 10. The method of Example 9, wherein the power electronics circuit further comprises a gate driver and passive devices.

Example 11. The method of Example 9, wherein the power electronics circuit is a chopper circuit, a DC-to-DC converter circuit, an inverter circuit, or a relay circuit.

Example 12. The method of Example 9, wherein the power semiconductor dies are silicon carbide dies.

Example 13. The method of Example 9, wherein capturing the first image comprises sensing ultraviolet light rays with an optical microscope, and the power module further comprises a passivation layer on the power semiconductor dies, the passivation layer being transparent to the ultraviolet light rays.

Example 14. The method of Example 9, wherein the die detection model comprises a convolutional neural network, and identifying the positions of the power semiconductor dies in the first image comprises processing the first image with the convolutional neural network to simultaneously predict bounding boxes of the power semiconductor dies in the first image and predict class probabilities for the bounding boxes.

Example 15. The method of Example 14, wherein identifying the positions of the power semiconductor dies in the first image further comprises downsizing the first image before processing the first image with the convolutional neural network.

Example 16. The method of Example 9, wherein the defect detection model comprises a convolutional neural network, and identifying the defects of the power semiconductor dies in the second images comprises processing the second images with the convolutional neural network to simultaneously predict bounding boxes of the defects in the second images and predict class probabilities for the bounding boxes.

Example 17. The method of Example 16, wherein identifying the defects of the power semiconductor dies further comprises upsizing the second images before processing the second images with the convolutional neural network.

Example 18. The method of Example 9 further comprising: training the die detection model with power module images; and training the defect detection model with power semiconductor die images.

Example 19. The method of Example 9 further comprising: performing a manufacturing process to form the power module, the defects of the power semiconductor dies being from the manufacturing process; and stopping the manufacturing process in response to identifying the defects of the power semiconductor dies.

Example 20. The method of Example 9 further comprising: performing a testing process to test the power module, the defects of the power semiconductor dies being from the testing process; and confirming the defects of the power semiconductor dies are present by visual inspection.

Example 21. A method comprising: training a defect detection model with first images of first power semiconductor dies, the defect detection model comprising a convolutional neural network; forming a power module comprising second power semiconductor dies; capturing second images of the second power semiconductor dies; and identifying defects of the second power semiconductor dies in the second images with the defect detection model by processing the second images with the convolutional neural network to simultaneously predict bounding boxes of the defects in the second images and predict class probabilities for the bounding boxes.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:
a processing tool configured to perform a manufacturing process to form a power module, the power module comprising power semiconductor dies;
a camera configured to capture a first image of the power module; and
a controller configured to:
identify positions of the power semiconductor dies in the first image with a die detection model comprising a convolutional neural network by processing the first image with the convolutional neural network to simultaneously predict bounding boxes of the power semiconductor dies in the first image and predict class probabilities for the bounding boxes;
extract second images of the power semiconductor dies from the first image according to the positions of the power semiconductor dies; and
identify defects in the second images with a defect detection model, the defect detection model being different from the die detection model.

2. The system of claim 1, wherein the controller is further configured to:
control the processing tool to stop the manufacturing process in response to identifying the defects in the second images.

3. The system of claim 1, wherein the camera comprises an optical microscope configured to sense ultraviolet light rays, and the power module further comprises a passivation layer on the power semiconductor dies, the passivation layer being transparent to the ultraviolet light rays.

4. The system of claim 1, wherein the controller is further configured to identify the positions of the power semiconductor dies in the first image by downsizing the first image before processing the first image with the convolutional neural network.

5. The system of claim 1, wherein the defect detection model comprises a second convolutional neural network, and the controller is configured to identify the defects in the power semiconductor dies in the second images by processing the second images with the second convolutional neural network to simultaneously predict bounding boxes of the defects in the second images and predict class probabilities for the bounding boxes.

6. The system of claim 5, wherein the controller is further configured to identify the defects in the power semiconductor dies by upsizing the second images before processing the second images with the second convolutional neural network.

7. The system of claim 1, wherein the controller comprises a memory, and the die detection model and the defect detection model are stored in the memory.

8. A method comprising:
capturing a first image of a power module, the power module comprising a power electronics circuit, the power electronics circuit comprising power semiconductor dies;
identifying positions of the power semiconductor dies in the first image with a die detection model;
extracting second images of the power semiconductor dies from the first image according to the positions of the power semiconductor dies in the first image; and
identifying defects in the power semiconductor dies in the second images with a defect detection model comprising a convolutional neural network by processing the second images with the convolutional neural network to simultaneously predict bounding boxes of the defects in the second images and predict class probabilities for the bounding boxes, the defect detection model being different from the die detection model.

9. The method of claim 8, wherein the power electronics circuit further comprises a gate driver and passive devices.

10. The method of claim 8, wherein the power electronics circuit is a chopper circuit, a DC-to-DC converter circuit, an inverter circuit, or a relay circuit.

11. The method of claim 8, wherein the power semiconductor dies are silicon carbide dies.

12. The method of claim 8, wherein capturing the first image comprises sensing ultraviolet light rays with an optical microscope, and the power module further comprises a passivation layer on the power semiconductor dies, the passivation layer being transparent to the ultraviolet light rays.

13. The method of claim 8, wherein the die detection model comprises a second convolutional neural network, and identifying the positions of the power semiconductor dies in the first image comprises processing the first image with the second convolutional neural network to simultaneously predict bounding boxes of the power semiconductor dies in the first image and predict class probabilities for the bounding boxes.

14. The method of claim 13, wherein identifying the positions of the power semiconductor dies in the first image further comprises downsizing the first image before processing the first image with the second convolutional neural network.

15. The method of claim 8, wherein identifying the defects in the power semiconductor dies further comprises upsizing the second images before processing the second images with the convolutional neural network.

16. The method of claim 8 further comprising:
training the die detection model with power module images; and
training the defect detection model with power semiconductor die images.

17. The method of claim 8 further comprising:
performing a manufacturing process to form the power module, the defects in the power semiconductor dies being from the manufacturing process; and
stopping the manufacturing process in response to identifying the defects in the power semiconductor dies.

18. The method of claim 8 further comprising:
performing a testing process to test the power module, the defects in the power semiconductor dies being from the testing process; and
confirming the defects in the power semiconductor dies are present by visual inspection.

19. A system comprising:
a processing tool configured to perform a manufacturing process to form a power module, the power module comprising power semiconductor dies;
a camera configured to capture a first image of the power module; and
a controller configured to:
identify positions of the power semiconductor dies in the first image with a die detection model;
extract second images of the power semiconductor dies from the first image according to the positions of the power semiconductor dies; and
identify defects in the second images with a defect detection model comprising a convolutional neural network by processing the second images with the convolutional neural network to simultaneously predict bounding boxes of the defects in the second images and predict class probabilities for the bounding boxes, the defect detection model being different from the die detection model.

20. The system of claim 19, wherein the controller is further configured to:
control the processing tool to stop the manufacturing process in response to identifying the defects in the second images.

21. The system of claim 19, wherein the camera comprises an optical microscope configured to sense ultraviolet light rays, and the power module further comprises a passivation layer on the power semiconductor dies, the passivation layer being transparent to the ultraviolet light rays.

* * * * *